US012801588B2

(12) United States Patent
Melyakov et al.

(10) Patent No.: US 12,801,588 B2
(45) Date of Patent: Nov. 17, 2026

(54) MECHANISMS FOR LOGICAL REFERENTIAL INTEGRITY IN RELATIONAL DATABASE MANAGEMENT SYSTEMS

(71) Applicant: Oracle International Corporation, Redwood Shores, CA (US)

(72) Inventors: Ivan Melyakov, Arlington, VA (US); Carlos Sierra, Snoqualmie, WA (US); Quais Taraki, Coupeville, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/939,646

(22) Filed: Nov. 7, 2024

(65) Prior Publication Data

US 2026/0127160 A1 May 7, 2026

(51) Int. Cl.
*G06F 16/23* (2019.01)
*G06F 11/07* (2006.01)
*G06F 16/2455* (2019.01)

(52) U.S. Cl.
CPC ...... *G06F 16/2365* (2019.01); *G06F 11/0757* (2013.01); *G06F 16/24565* (2019.01)

(58) Field of Classification Search
None
See application file for complete search history.

(56) References Cited

U.S. PATENT DOCUMENTS

| | | | | |
|---|---|---|---|---|
| 6,304,876 | B1 * | 10/2001 | Isip, Jr. | G06F 16/2365 707/999.102 |
| 11,243,956 | B1 * | 2/2022 | Papakonstantinou | G06F 16/24565 |
| 12,450,228 | B1 * | 10/2025 | Crouch | G06F 16/2379 |
| 2003/0200219 | A1 * | 10/2003 | Wang | G06F 16/284 |
| 2004/0122868 | A1 * | 6/2004 | Chan | G06F 16/2365 |
| 2004/0215670 | A1 * | 10/2004 | Holenstein | G06F 16/2343 |
| 2005/0021567 | A1 * | 1/2005 | Holenstein | G06F 16/273 |
| 2005/0283485 | A1 * | 12/2005 | Blaicher | G06F 11/0766 |
| 2009/0292711 | A1 * | 11/2009 | Konik | G06F 16/24565 |

* cited by examiner

*Primary Examiner* — Irene Baker
(74) *Attorney, Agent, or Firm* — Hickman Becker Bingham Ledesma LLP

(57) ABSTRACT

Techniques provide mechanisms for logical referential integrity in relational database management systems. A child record with a foreign key can be inserted into a child table out of order from inserting parent record with the primary key without foreign key violations. When the child record is inserted a referential integrity check is performed to determine whether the primary key exists in a parent table. An integrant field for each child record is set to indicate whether the primary key exists. Query results can filter out records that do not have referential integrity.

14 Claims, 5 Drawing Sheets

MECHANISMS FOR LOGICAL REFERENTIAL INTEGRITY IN RELATIONAL DATABASE MANAGEMENT SYSTEMS

FIELD

The present application relates to database systems and, more specifically, to mechanisms for logical referential integrity for records in parent and child tables in relational database management systems.

BACKGROUND

A relational database organizes data into tables that include rows and columns. Each row represents a unique record, and each column represents a field within the record. A foreign key is used in a child table to reference a record with a corresponding primary key in a parent table. For example, a database can include a table for departments and a table for employees. The department table can include Department ID, Manager, Phone fields, while the employee table can include Employee ID, Name, Address, and Department ID fields. The Department ID field of the employee table acts as a foreign key that links each employee to a specific department in the department table, which creates a parent and child relationship between the tables.

Referential integrity requires that any foreign key value in a child table must match an existing primary key value in the related parent table to ensure consistency of data within relationships between tables. In the example above, a value in a cell of the Department ID field of a record of the employee table must correspond to a valid value in a cell of a record of the Department ID field in the department table. Referential integrity prevents foreign key violations. An example foreign key violation is a foreign key value in a record of a child table, where the foreign key value does not match a primary key value in a parent table, such as when the record in the child table is inserted before a record holding that primary key value has been inserted in the parent table. A foreign key value that does not match a primary key value may be referred to herein as a dangling foreign key value.

Relational databases are managed using a Relational Database Management System (RDBMS). A RDBMS provides an interface between users and applications and the database and also provides administrative functions for managing data storage, access, and performance. For example, an RDBMS allows users to create, read, update, and delete data.

As mentioned, records having a foreign key value are sometimes inserted into a child table before a record with a matching primary key value is inserted into the parent table. For example, control planes manage the lifecycle of cloud resources. As a particular example, when a Compute Virtual Machine is created, a control plane orchestrates writing records to a configuration database that describe a configuration of the Computer Virtual Machine. Thus, control planes can be used to handle tasks like creating, updating, and deleting resources for inventory updates. Control plane events can be processed and stored in a set of relational tables collectively representing a customer's inventory state in Near-Real-Time (NRT). Customer inventory tables have foreign key constraints denoting logical relationships between resources. The control planes can be independent, uncoordinated, and asynchronous. This means records are inserted into parent and child tables out of order. For example, a resource record with a foreign key value can be inserted into a child table before a resource record with the matching primary key value is inserted into the parent table. This ingestion of such disjoint events into a relational database with foreign key constraints typically leads to foreign key violations and ingestion pipeline brittleness.

For example, the RDBMS could enforce foreign key constraints, but this would result in rejecting attempts to insert child resource records with the foreign keys when the parent record with the primary key does not exist. This causes the concept of a brittle ingestion pipeline because it is undesirable and infeasible to force customers and control planes to coordinate the entry of all records in a specific sequence.

Also, if the foreign key constraints are not enforced, customers receive incomplete information with a lack of referential integrity. For example, if a customer queries their data store, they see dangling resources without information from the primary key of records that do not exist, and the customer does not know why there is a key to a non-existent record.

The approaches described in this section are approaches that could be pursued, but not necessarily approaches that have been previously conceived or pursued. Therefore, unless otherwise indicated, it should not be assumed that any of the approaches described in this section qualify as background merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Figure 1:
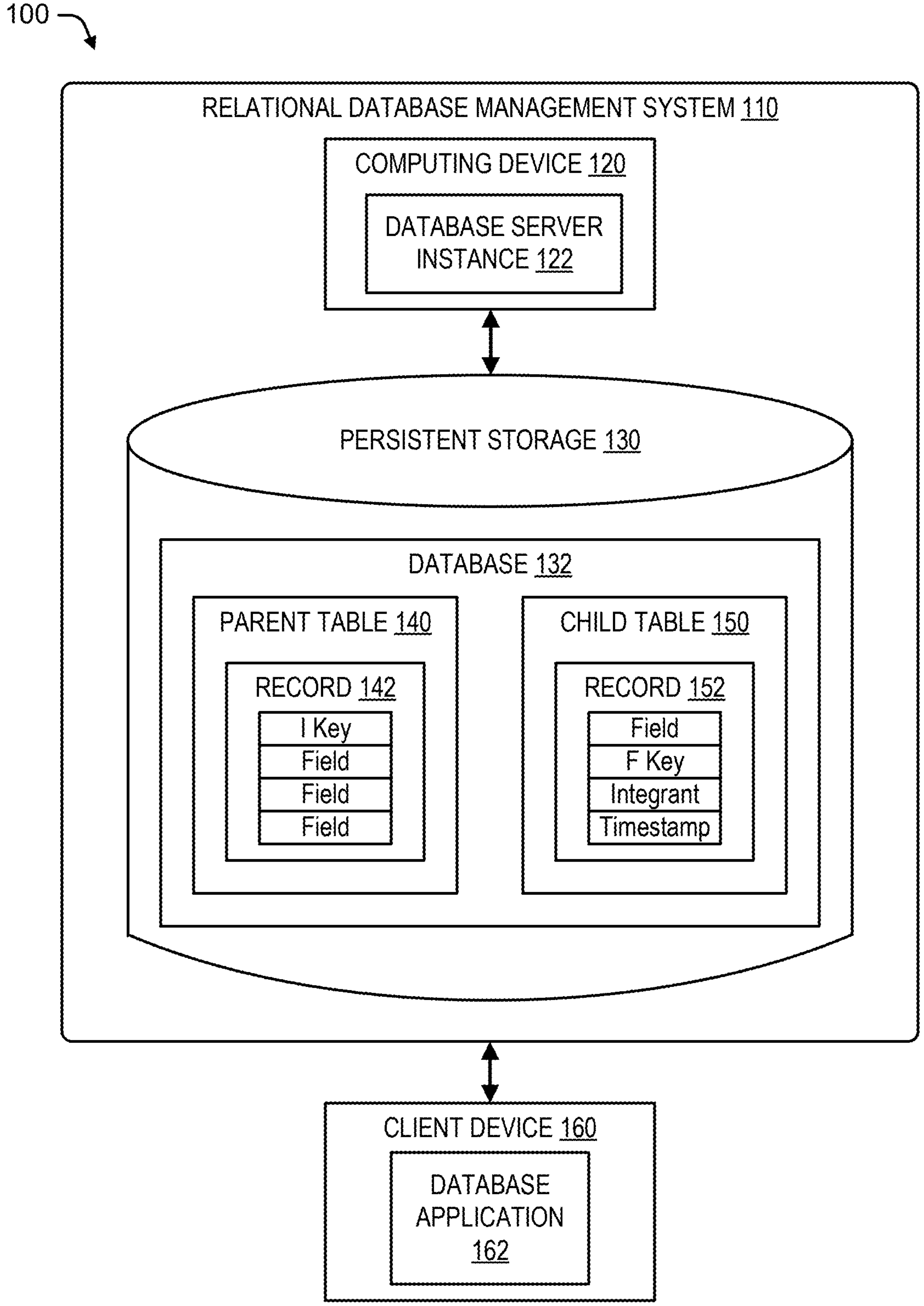
FIG. 1 is an example illustration of a database system configuration according to a possible embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided for logical referential integrity in a RDBMS. Queries can filter out child table records that have foreign key values that are not present in a primary key. Records with foreign key values that do not match primary key values can be entered without foreign key constraint violations.

A child table includes a foreign key that is a field that identifies records of a parent table. A foreign key value in a child table record identifies a parent table record by matching a primary key value in the parent table record. Each record in the child table also includes an integrant field that indicates whether a foreign key value of the record is present in a parent table, in other words, indicates whether the foreign key value is a dangling foreign key value. When the child table is queried, child table records are filtered out when the integrant field of a child table record indicates that the no records in the parent table have a primary key value that matches the foreign key value in the child table record. Thus, the query will not return any child table rows having dangling foreign key values.

Integrant Fields

Logical referential integrity can be provided using one or more internal integrant fields that ensure that any data that is visible to a user exhibits referential integrity. Every foreign key constraint within a table is represented by a metadata status field, such as an integrant field. Parental foreign key constraints are evaluated when a record with a foreign key is inserted into a child table. If the key constraints are met, a successful status is written in the metadata field to indicate the record is integrant.

For example, a record with a foreign key value is inserted into a child table. A check is performed to determine whether that foreign key value exists in a primary key of a record of a parent table. If the value exists in a record, the integrant field is set to a corresponding value, such as true, success, a Boolean value, or any other useful value. If the value does not exist, the integrant field is set to a corresponding value, such as false, negative, or other useful value.

Convergence Job

A periodic referential integrity convergence job runs on a loop and index-scans non-integrant records to continuously check whether parental constraints are satisfied. The convergence job checks the records with unmet integrity constraints and updates the integrant field with a success value when the key constraint is met to indicate the record is integrant.

For example, if a record integrant field of record indicates that the foreign key value is not present because the record did not exhibit referential integrity, the convergence job periodically checks for the foreign key value in the primary key of the parent table. When a record including the primary key value is written to the parent table, the key meets the constraints, and the convergence job updates the integrant field with a success indicator.

A parent table can also be a child of at least one other parent table when the parent table includes its own foreign key. The convergence job can also verify whether such parent records themselves have met referential integrity constraints. For example, the convergence job is an index job that pulls up all the records that have an integrant field set to false. The convergence job checks for child table record foreign key values in the primary key of parent tables to verify whether the foreign key values exist in the parent table. The convergence job also checks whether the parent records themselves are integrant to verify the child record is integrant.

Thus, the convergence job performs a fully indexed lookup for all records that have unmet integrity, such as unmet constraints, and updates their status upon validating that their parent records are in place. All of integrant fields are fully indexed and the convergence job may only rely on the integrant field, which allows the scanning to run in a tight loop with little overhead, thereby guaranteeing low convergence latency.

Time Stamp

The child table includes a timestamp field to ensure that this referential integrity convergence job does not check non-integrant child table records indefinitely. For example, a record with a dangling foreign key value in the primary key of a parent table may never be inserted into the parent table and the timestamp can allow the convergence job to cease checking after an amount of time has passed so it does not keep checking integrity forever.

There also may be a non-trivial amount of these records that never become integrant. To avoid issues with records that never become integrant, the convergence job stops checking the record when the record's integrant check timestamp indicates a time horizon has been exceeded. A notification can provide an alert that the necessary records have not been provided. In a possible implementation, a separate job can check for non-integrant records with timestamps that have exceeded the horizon and can issue notification of the dangling records that have not converged. For example, the job can select instances where the integrant field is false and the timestamp has exceeded the horizon, and the job can issue a corresponding notification.

Query Filtering

A set of views hides the internal integrant fields and only returns records which are in an integrant state. Thus, the integrant fields ensure records only become visible when all of pertinent foreign key constraints are met. For example, a view only returns the records with a true integrant field status. If the record has a false integrant status, the record will not be returned to the user.

Historic snapshot tables can be populated from the logically consistent views. For example, periodic snapshots of NRT data can be taken and stored in a set of historic analytic tables. These tables represent changes to records in the tables, such as changes in inventory, over time.

Logical Referential Integrity

Embodiments provide logical referential integrity because the records do not exhibit referential integrity at the database layer, but the user is provided with a fully integrant database representation, which results in read-time referential integrity. For example, when the user performs a query on a particular table, the view will not show records that are not integrant. This allows a user to query what appears to be a referentially integrant database. Thus, the user receives results with logical referential integrity from their query. For example, the user sees a logically consistent representation of records from the query.

Example Scenarios

Embodiments can be applicable to scenarios where records with foreign and primary keys are inserted out of order, applicable to scenarios with NRT record insertions, applicable to scenarios with an event stream of record updates into a relational database, applicable to scenarios for inventory management, and applicable to other scenarios.

Flexible and Reliable Record Insertion

At least some embodiments can ensure that ingestion of the records is flexible, robust, and reliable, while avoiding foreign key constraint violations. This allows for a robust ingestion pipeline that allows real time insertion of records with foreign key values that do not yet exist in primary keys. For example, child records can be inserted out of order with their corresponding parent records. A child record with a foreign key value is allowed to be written to the database before the parent record with the matching primary key value is inserted. Thus, a user is not subjected to foreign key constraints and is allowed to write dangling records that include foreign key values that do not yet exist.

Integrant Record Presentation

Embodiments allow presentation of records to users in a logically consistent, referentially integrant way. Users are provided with a logically referential integrant view of records when not all records have referential integrity. For example, record data can be presented to users while excluding records with foreign keys that point to primary keys of records that do not exist. When the record with the primary key is populated, the record with the foreign key is presented to the users. Thus, queries are provided without nonsensical dangling pointers of foreign key values to primary key values that do not exist. Strong referential integrity is provided in user analytic snapshot tables with full foreign key support. Also, NRT tables can be provided that do not show dangling resources. Furthermore, database join and query operations will not fail just because records have been inserted out of order.

Example Database System

FIG. 1 is an example illustration of a database system configuration 100 according to a possible embodiment. Embodiments are described herein in the context of the example database system configuration 100. The database system configuration 100 includes an RDBMS 110 that includes a computing device 120. A database server instance 122 runs on the computing device 120. The RDBMS 110 maintains a database 132 containing database objects in persistent storage 130. The database objects include at least one parent table 140 and at least one child table 150. The parent table 140 contains at least one parent record 142 including a primary key (I Key) and other fields. The child table 150 contains at least one child record 152 including a foreign key (F Key), an integrant field, a time stamp field, and other fields. A client device 160 is communicatively coupled to RDBMS 110 in any way, including via a network. In this example configuration, a database application 162 running on the client device 160 establishes a database session with the database server instance 122 to execute database commands from the application 162.

Logical Referential Integrity Operation

Figure 2:
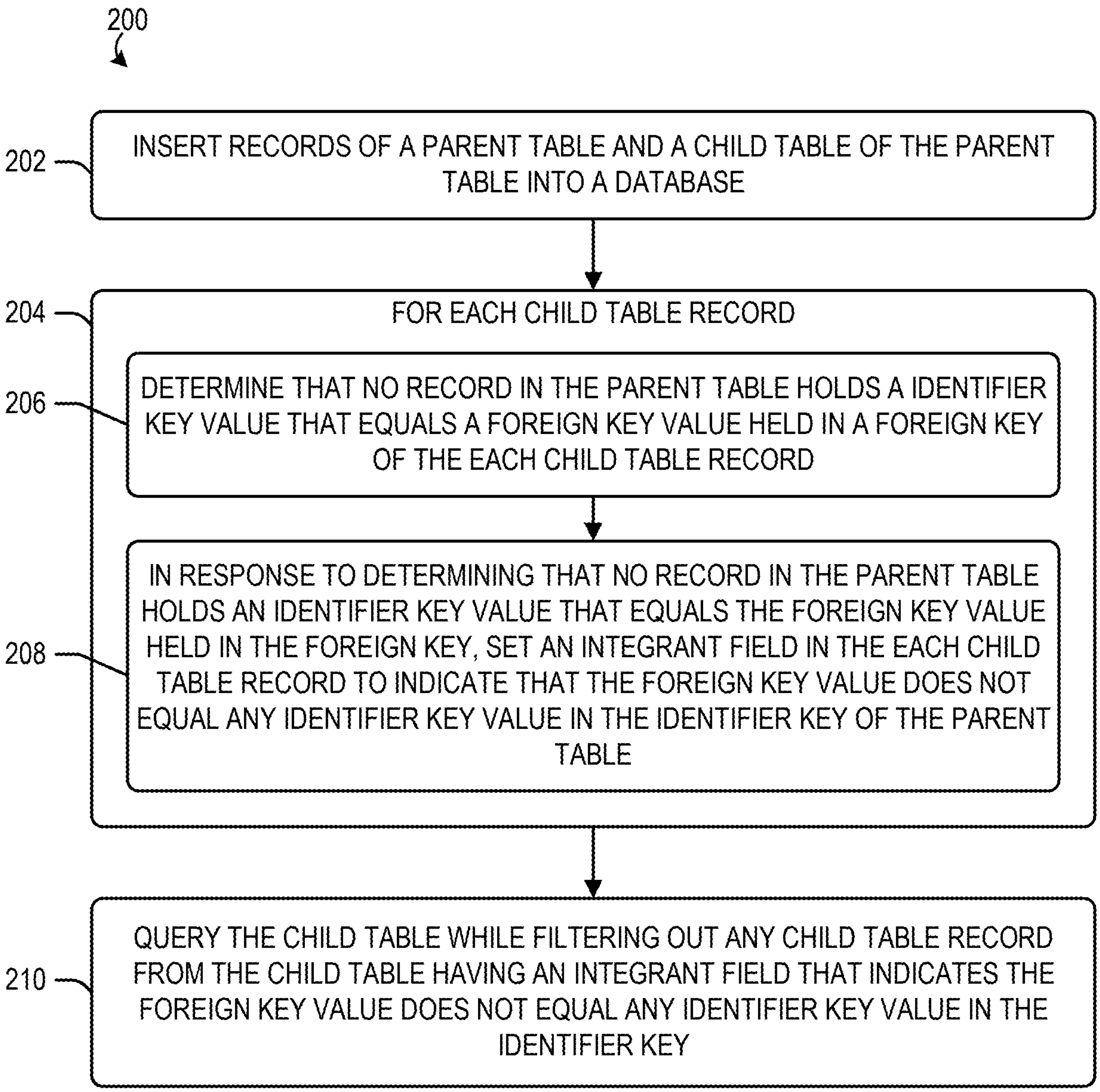
FIG. 2 is an example flowchart of a method of operation of a RDBMS according to a possible embodiment for a mechanism for logical referential integrity.

FIG. 2 is an example flowchart of a method 200 of operation of the RDBMS 110 according to a possible embodiment for a mechanism for logical referential integrity. At 202, the method 200 includes inserting records of a parent table and a child table of the parent table into a database. The child table includes a foreign key that includes a plurality of foreign key values. The parent table includes a primary key that includes a plurality of primary key values.

At 204, the method 200 includes operations for each child table record of a set of child table records of the child table. At 206, the operations for each child table record include determining that no record in the parent table holds a primary key value that equals a foreign key value held in the foreign key of each child table record. At 208, the operations for each child table record include, in response to determining that no record in the parent table holds an primary key value that equals the foreign key value held in the foreign key of the each child table record, setting an integrant field in the each child table record to indicate that the foreign key value does not equal any primary key value in the primary key of the parent table.

The integrant field can be set to false, negative, non-integrant, a zero value, or to any other value that indicates a foreign key value does not equal any primary key value in a primary key of a parent table. When a foreign key of a child table record equals a primary key value of the parent table, the integrant field of a child record can also be set to true, positive, integrant, a one value, or any other corresponding value. The integrant field can also be set based on multiple foreign key values not equaling any primary key values in multiple parent tables.

At 210, the method 200 includes querying the child table. The query can be a request for data from the child table. It can be an action on the data and/or a request for data results. Querying the child table includes filtering out any child table record from the child table having an integrant field that indicates a foreign key value therein does not equal any primary key value in the primary key. Querying can include querying a view that filters records based on the integrant field. The querying can be performed in response to receiving a database statement from a client of a database management system that manages the database, where the database statement specifies to filter based on the integrant field. For example, a database statement can be the query that asks the database to return data.

In a possible embodiment, a database process repeatedly scans for child table records that have the integrant field set to indicate the foreign key value does not equal any primary key value in the primary key. The determining and setting can be repeated for child table records that have the integrant field set to indicate the foreign key value does not equal any primary key value in the primary key. If the foreign key value of a child record equals a primary key value in the primary key of the parent record, the integrant field can be changed to indicate the corresponding child record is integrant.

In a possible implementation of the repeated scanning, a timestamp can be used to avoid excessive scan repetitions. For example, each child table record includes a time stamp field that indicates a time when an initial determination was made of a primary key value equaling a foreign key value. The method 200 can then include additional operations for each child table record that has an integrant field set to indicate that the foreign key value does not equal any primary key value in the primary key of the parent table. The additional operations can include comparing an initial determination time period from the time when the initial determination was made to a threshold time period. The additional operations can also include stopping the repeated scanning based on the initial determination time period exceeding the threshold time period. An integrity check failure alert can be issued based on the initial determination time period exceeding the threshold time period.

In a possible implementation, the parent table can include at least foreign key of its own and the method 200 can check whether foreign key values in the parent table are integrant. For example, the parent table can include a second foreign key that includes a plurality of second foreign key values and a second parent table includes a second primary key that includes a plurality of second primary key values. In this implementation, the method 200 can perform parent table integrant check operations for each parent table record of a set of parent table records of the second parent table. The parent table integrant check operations can include determining that no record in the second parent table holds a second primary key value that equals a second foreign key value held in the second foreign key of each parent table record. The parent table integrant check operations can include, in response to determining that no record in the second parent table holds a second primary key value that equals a second foreign key value held in the second foreign key of the each parent table record, setting a second integrant field in the each parent table record to indicate that the second foreign key value does not equal any second primary key value in the second primary key of the second parent table. The method 200 can then query the parent table, where querying the parent table includes filtering out any parent table record from the parent table having a second integrant field that indicates the second foreign key value does not equal any second primary key value in the second primary key.

Example Implementation

Figure 3:
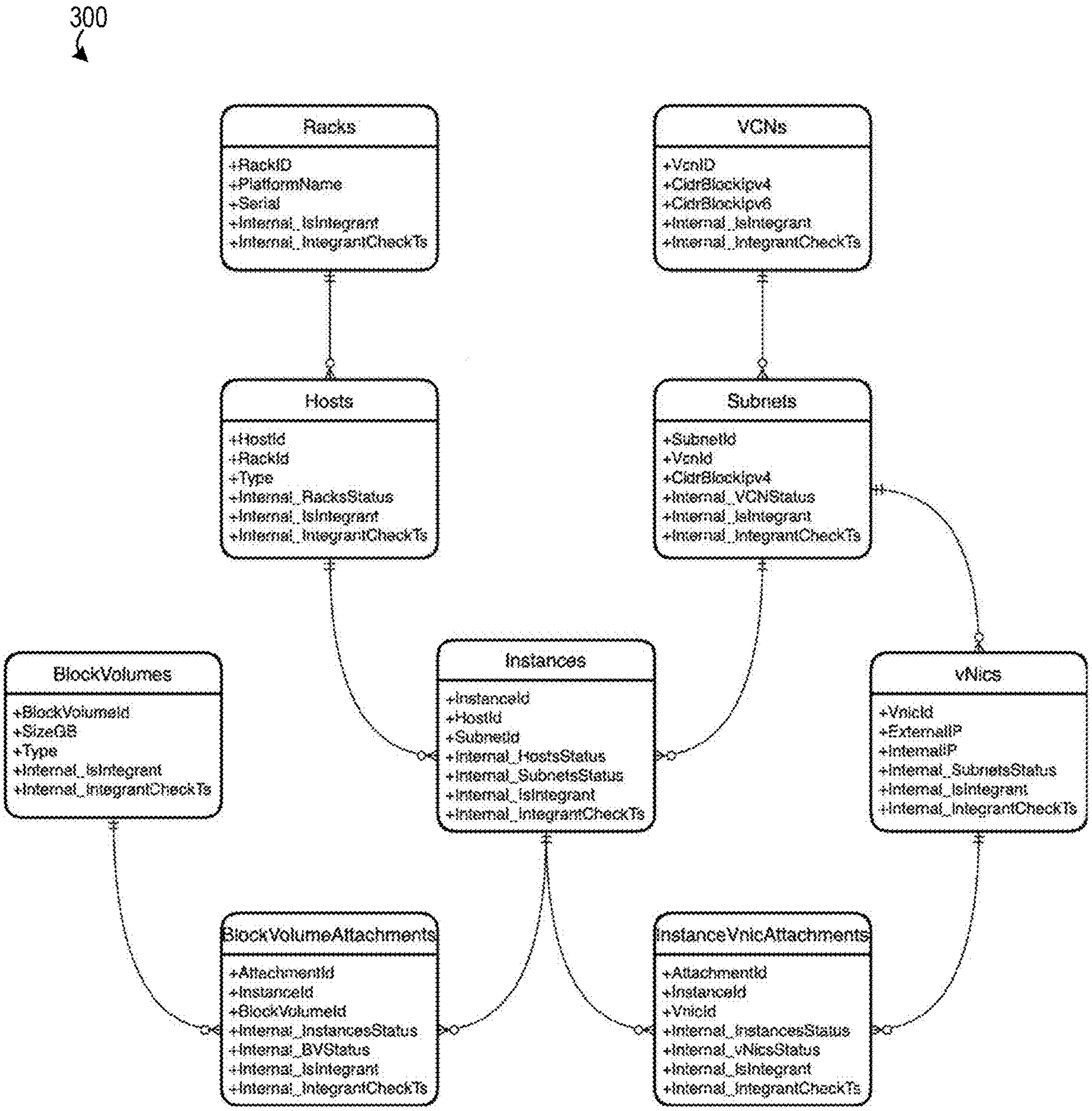
FIG. 3 is an entity relational diagram showing relationships between various resources in tables of a database according to a possible embodiment.

FIG. 3 is an entity relational diagram 300 showing relationships between various resources in tables of a database according to a possible embodiment. The diagram 300 is only an example scenario that is used to illustrate operation of a mechanism for logical referential integrity. The diagram 300 approximates a resource relationship clique within a group of resources that are interconnected and that are managed together to ensure proper network configuration and security. The diagram 300 is not a mirror representation of reality and is not full and complete. The diagram 300 is a self-contained and simple example whose purpose is to demonstrate referential integrity constraints and violations.

The diagram 300 includes tables for Racks, Virtual Cloud Networks (VCNs), Hosts, Subnets, Block Volumes, Instances, vNics, Block VolumeAttachments, and Instance VnicAttachments. The tables include fields, such as columns. For example, the Instances table includes fields for InstanceId, HostId, SubnetId, Insternal_HostsStatus, Internal_SubnetStatus, Internal_IsIntegrant, and Internal_IntegrantCheckTs. The fields include foreign keys and primary keys referenced by the foreign keys. For example, as the Instances table HostId foreign key references the Host table HostId primary key. The fields also include metadata fields, such as columns, including parent referential integrity status fields, integrant status fields, and timestamp fields. The referential integrity status fields and the integrant status fields may both be considered integrant fields.

The parent referential integrity status fields indicate whether foreign key constraints for a particular parent table have been satisfied for a record. For example, the Internal_HostsStatus field in the Instances table indicates whether the Instances table HostId foreign key value of a record is present in the Hosts table HostsId primary key.

The integrant status fields indicate whether foreign key constraints for all parent tables have been satisfied for a record. For example, the Internal_IsIntegrant field in the Instances table indicates whether the Internal_HostsStatus field and the Internal_SubnetStatus field indicate the corresponding foreign keys in the record have referential integrity.

The Internal_IsIntegrantTs timestamp fields indicate the time an initial referential integrity check was performed for a record. A period from performance of the initial referential integrity check can be compared to a threshold period to prevent a periodic referential integrity convergence job from running indefinitely on records that may never have referential integrity.

These metadata fields are labeled as internal because they are used internally. The data in the internal metadata columns may not be visible to the end user. For example, the tables are wrapped in utility views for the end user who accesses the tables through the views rather than directly.

For the sake of this example, the referential integrity constraints can be based on:

1. VCNs, Racks, and Block Volumes exist in their own right.
2. Hosts are placed on a Rack.
3. Subnets exist within VCNs, where Subnet Classless Inter-Domain Routing (CIDR) is a subset of the VCN CIDR.
4. Instances exist on a Host and within a Subnet.
5. Virtual network interface cards (vNics) exist within a Subnet.
6. Block VolumeAttachments exist in context of an Instance and a Block Volume.
7. Instance VnicAttachments exist in context of an Instance and a vNic.

Event Ordering

Desegregated, independent, non-correlated events can come in for the resources. The events can be insert queries that insert new records to tables of the database. For example, a customer programmatically creates a new Subnet in an existing VCN and launches an operation for computing an Instance with a default Block Volume and a default vNic. Instance computation, Block, and VCN control planes fulfill the creation requests and emit records independently of one another. A RDBMS receives events to insert the records in the following order:

t1. vNIC Attachment record
t2. Block Volume Attachment record
t3. Block Volume record
t4. Instance record
t5. vNic record
t6. Subnet record For example, first a vNic attachment record is inserted, then a Block Volume Attachment record, etc. This sequence causes a problem when records with foreign key values are inserted before records with the corresponding primary key values. For example, a vNic Attachment record added at t1 will have a Vnicid and InstanceID foreign key values, but the corresponding Instance record has not yet been added at t4 and the corresponding vNic record has not yet been added at t6. If a customer were to query the database between any of the above timestamps they would receive incomplete data. For example, if a query were to be executed between times t1 and t2, the customer would see a vNic attachment without a corresponding instance or vNic, if a query were to be executed between times t4 and t5, the customer would see an instance without a corresponding subnet, etc.

Logical Referential Integrity

As described above, the principle of the logical referential integrity approach is based on a set of metadata columns that are used to ensure that any data that is visible to the customer exhibits referential integrity. A periodic convergence job performs indexed scans for all records with unmet integrity constraints and updates their status, as necessary. Since all metadata columns are fully indexed, the convergence job can run in a tight loop with little overhead, thereby guaranteeing low convergence latency. As an example, a mechanism for logical referential integrity works in the following manner:

Every foreign key constraint within a table is represented by a metadata status column.

At the time a record is written to a table, parental foreign key constraints are evaluated. If they are met, a successful status is written in the metadata columns.

A referential integrity convergence job runs on a loop and index-scans non-integrant records. The job continuously checks whether parental constraints are satisfied.

A set of views hides internal metadata columns and only displays records which are in an integrant state.

Historic snapshot tables are populated from the logically consistent views.

Convergence Example

The example below works through an unordered event receipt order and demonstrates how the above approach results in logically referentially integrant data.

Set Up

Each child table has a pointer column to the parent table, for example, the "Block Volume Attachments" table has pointers to "Internal_InstanceStatus" and "Internal_BVStatus" because it has a parent-child relationship with both Instances and Block Volumes. All tables have a column that represents the union state of the referential integrity constraints of all their parents. In this example, this column is called "Internal_IsIntegrant." For example, if the Block VolumeAttachments table has a corresponding Instance, but a parent Block Volume has not yet been written, the "Internal_IsIntegrant" column will be 'false'. Once all of the referential requirements are met, the "Internal_IsIntegrant" column becomes 'true'. All foreign key columns are fully indexed to facilitate quick lookups.

At writing time, such as when records are inserted, an indexed ingestion process checks all parent columns for foreign key values. If they are found, a "s" status is written (denoting "success") and if a value is missing, a "f" status is written (denoting "failure"). If all referential integrity checks pass, a 'true' status is written into the 'Internal_IsIntegrant' column, and 'false' is written otherwise. Additionally, a timestamp is maintained which reflects the first time that a referential integrity check was performed. An ingestion timestamp, such as the time the record is inserted, can be reused for this purpose.

A convergence process runs in the background and finds all records with a non-integrant status and re-checks to see if their parent pointers have been written. If the "Internal_IntegrantCheckTs" timestamp exceeds a threshold value, the checker stops checking the given record and an alarm is issued as a notification of a breach of standards and targets for record insertion.

Example Event Receipt Ordering

The following description shows an example event receipt ordering for inserting records into respective tables. For the purpose of this example, the integrity convergence checker runs every two clock cycles, i.e., after t1 and t2, then again after t3 and t4 and finally after t5 and t6.

t1: Instance VnicAttachments record insertion:

t1 is written into "Internal_IntegrantCheckTs" column.

The Instances table is checked, no parent record is found, and "f" is written into the "Internal_InstanceStatus" column.

The vNic table is checked, no parent record is found, and "f" is written into the "Internal_vNicStatus" column.

Since Instances and vNics parent pointers are unmet, 'false' is written into the "Internal_IsIntegrant" column.

t2: Block Volumeattachments record insertion:

t2 is written into "Internal_IntegrantCheckTs" column.

The Block Volumes table is checked, no parent record is found, and "f" is written into the "Internal_BVStatus" column.

The Instances table is checked, no parent record is found, and "f" is written into the "Internal_InstancesStatus" column.

Since neither Block Volumes nor Instances pointers are met, 'false' is written into the "Internal_IsIntegrant" column.

t2.5: Integrity Convergence Execution:

Find all records with 'false' in the "Internal_IsIntegrant" column. Two records are found: one Block Volume Attachment record and one Instance vNic Attachment record. Check their parent pointers and if they are found, mark their respective parent pointer columns as "s" (success).

For the Block VolumeAttachment Record:

The Block Volumes table is checked, no parent record is found, and "f" is written into the "Internal_BVStatus" column.

The Instances table is checked, no parent record is found, and "f" is written into the "Internal_InstancesStatus" column.

For the Instance vNic Attachment Record:

The Instances table is checked, no parent record is found, and "f" is written into the "Internal_InstanceStatus" column.

The vNics table is checked, no parent record is found, and "f" is written into the "Internal_vNicStatus" column.

t3: Block Volumes record insertion:

t3 is written into the "Internal_IntegrantCheckTs" column.

Since in this example Block Volumes do not depend on any other resources, "true" is written into the Internal_IsIntegrant" column. Consequently, the Block Volume record becomes visible to the customer.

t4: Instances record insertion:

t4 is written into the "Internal_IntegrantCheckTs" column.

The Hosts table is checked, a parent record is found, and "s" is written into the "Internal_HostsStatus" column.

The Subnets table is checked, no parent record is found, and "f" is written into the "Internal_SubnetStatus" column.

Though the Hosts record is found, "f" is still written into the "Internal_IsIntegrant" column since there is no parent Subnet record and the "Internal_SubnetStatus" column indicates "f".

t4.5: Integrity Convergence Execution:

Find all records with 'false' in the "Internal_IsIntegrant" column. Three records are found: one Block Volume Attachment record, one Instances record, and one vNicRecord. Their parent pointers are checked, and if they are found, their respective parent pointer columns are marked as "s".

For the Block VolumeAttachment Record:

The Block Volumes table is checked, a parent record is found, and "s" is written into the "Internal_BVStatus" column.

The Instances table is checked, no parent record is found, and "f" is written into the "Internal_InstancesStatus" column. The column is not marked with "s" because the parent record status for "Internal_IsIntegrant" is 'false' at this point.

The Subnets table is checked, no parent record is found, and "f" is written into the "Internal_SubnetStatus" column.

For the Instances Record:

The Hosts table is checked, a parent record is found, "s" is written into the "Internal_HostsStatus" column.

The Subnets table is checked, no parent record is found, and "f" is written into the "Internal_SubnetStatus" column.

t5: VNics record insertion:

t5 is written into the "Internal_IntegrantCheckTs" column.

The Subnets table is checked, a parent record is not found, and "f" is written into the "Internal_SubnetsStatus" column.

Since Subnet pointer is non-existent, 'false' is written into the "Internal_IsIntegrant" column.

t6: Subnets record insertion:

t6 is written into the "Internal_IntegrantCheckTs" column.

The VCNs table is checked, a parent record is found, and "s" is written into the "Internal_VCNStatus" column.

Since the VCN pointer is met, 'true' is written into the "Internal_IsIntegrant" column.

t6.5: Integrity convergence execution:

Find all records with 'false' in the "Internal_IsIntegrant" column, the result set yields vNics, instances, block volume attachments, and instances.

For each of the records, check their parent pointers and if their "Internal_IsIntegrant" status is true, toggle the records to "Internal_IsIntegrant" 'true' status.

Make all records visible to the end-user.

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
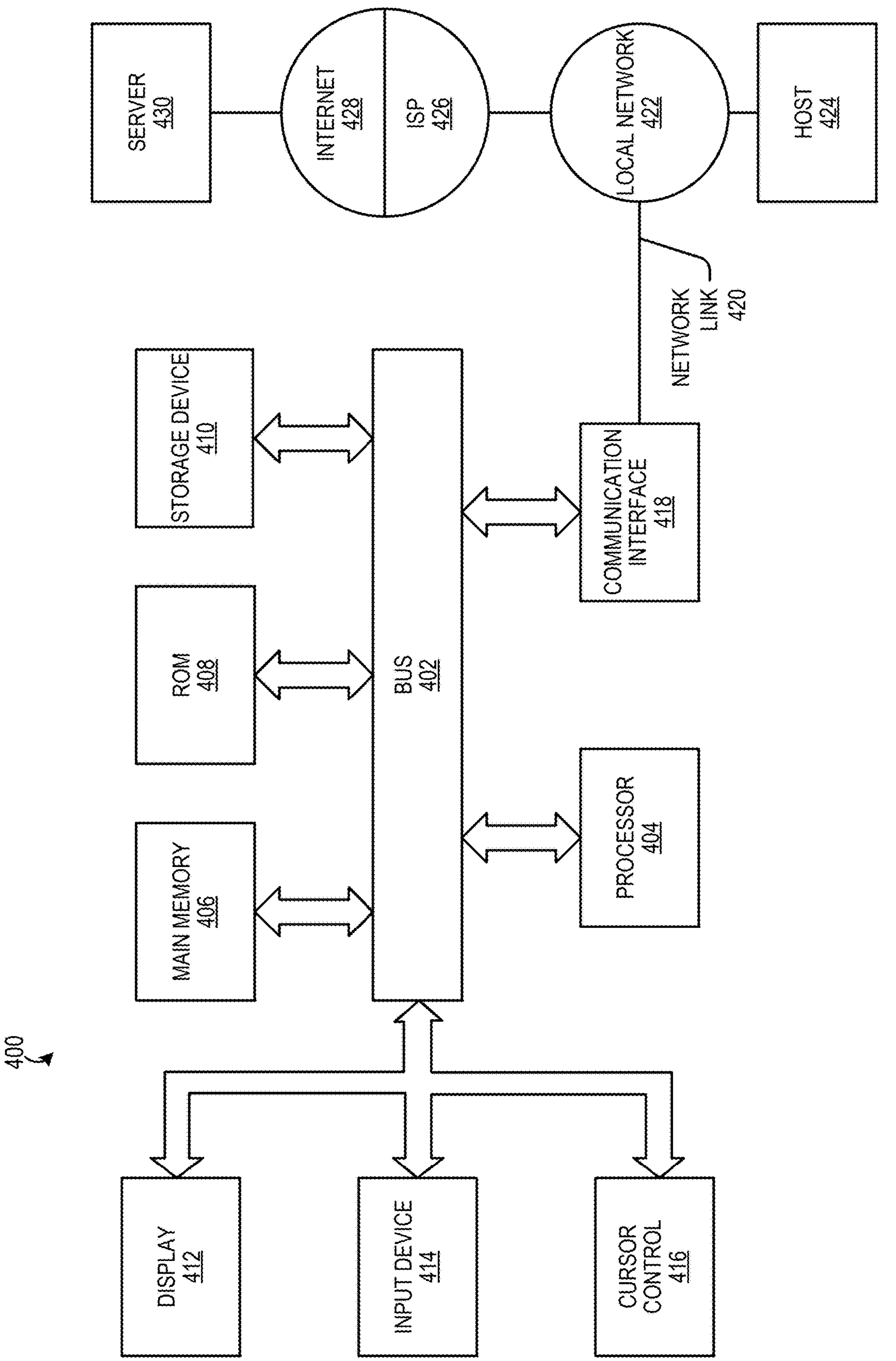
FIG. 4 is a block diagram that illustrates a computer system upon which aspects of the illustrative embodiments may be implemented.

For example, FIG. 4 is a block diagram that illustrates a computer system 400 upon which aspects of the illustrative embodiments may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412 for displaying information to a computer user. An input device 414, including alphanumeric and other keys, is coupled to bus 402 for communicating information and command selections to processor 404. Another type of user input device is cursor control 416, such as a mouse, a trackball, a touch screen, a track pad, and/or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and/or any other storage media.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem or send the instructions using a network. A receiver, such as a modem, local to computer system 400 can receive the data and use, for an example, an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented, such as to a wireless local area network (WLAN) or to a cellular network. In any such implementation, communication interface 418 sends and receives electrical, electromagnetic, radio, optical, and/or other signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world-wide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Over View

Figure 5:
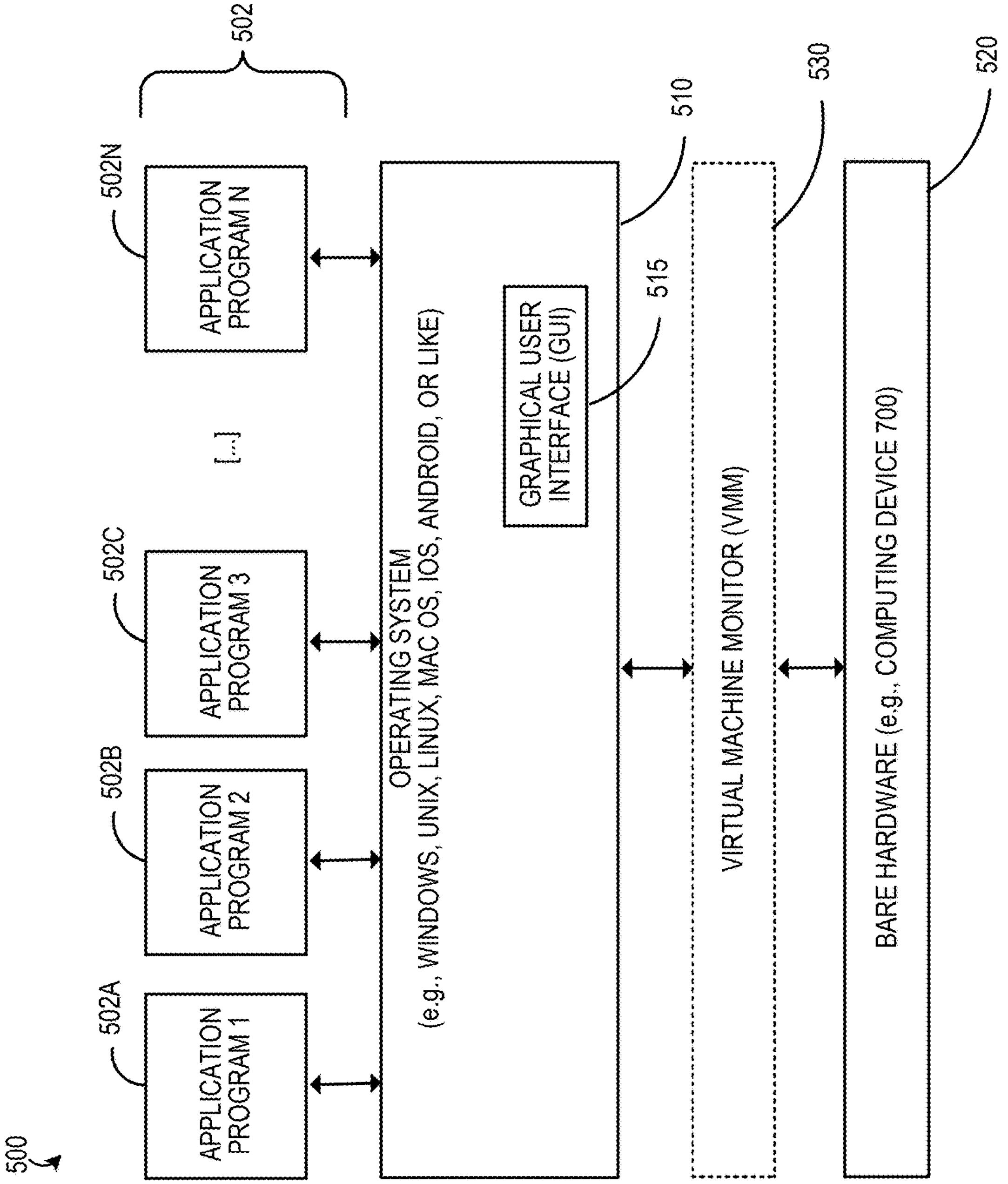
FIG. 5 is a block diagram of a basic software system that may be employed for controlling the operation of a computer system to implement aspects of the illustrative embodiments.

FIG. 5 is a block diagram of a basic software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

inserting records of a first parent table and a child table of said first parent table into a database, wherein said child table includes a first foreign key that includes a plurality of first foreign key values, wherein said first parent table includes a first primary key that includes a plurality of first primary key values;

for each child table record of a set of child table records of said child table:

determining that no record in said first parent table holds a first primary key value that equals a first foreign key value held in the first foreign key of said each child table record; and in response to determining that no record in said first parent table holds a first primary key value that equals the first foreign key value held in the first foreign key of said each child table record, setting an integrant field in said each child table record to indicate that said first foreign key value does not equal any first primary key value in said first primary key of said first parent table, said integrant field being indexed on an index;

repeatedly index scanning, by a database process, on said index to continuously check for child table records that have the integrant field set to indicate said first foreign key value does not equal any first primary key value in said first primary key:

for each child table record identified by said repeated index scanning:

determining whether a record in said first parent table includes a first primary key value that equals the first foreign key value in said each child table record, where said first parent table is a child of a second parent table, in response to determining that said record in said first parent table includes the first primary key value, determining whether said record in said first parent table is integrant with the second parent table; and in response to determining that said record in said first parent table is integrant, updating the integrant field of said each child table record to indicate that said first foreign key value equals a first primary key value in said first primary key; and querying said child table, wherein querying said child table includes filtering out any child table record from said child table having an integrant field that indicates said first foreign key value does not equal any first primary key value in said first primary key.

2. The method of claim 1, wherein said querying includes querying a view that filters records based on each said integrant field.

3. The method of claim 2, wherein the view filters records based on said integrant field.

4. The method of claim 1, wherein said querying is performed in response to receiving a database statement from a client of a database management system that manages said database, said database statement specifying to filter based on said integrant field.

5. The method of claim 1, wherein each child table record includes a time stamp field that indicates a time when an initial determination was made of a first primary key value not equaling a first foreign key value, wherein the method comprises, for each child table record that has an integrant field set to indicate that said first foreign key value does not equal any first primary key value in said first primary key of said first parent table:

comparing an initial determination time period from the time when the initial determination was made to a threshold time period; and stopping the repeated index scanning based on the initial determination time period exceeding the threshold time period.

6. The method of claim 5, further comprising issuing an integrity check failure alert based on the initial determination time period exceeding the threshold time period.

7. The method of claim 1, wherein the first parent table comprises a second foreign key that includes a plurality of second foreign key values;

wherein the second parent table includes a second primary key that includes a plurality of second primary key values;

for each first parent table record of a set of first parent table records of said second parent table:

determining that no record in said second parent table holds a second primary key value that equals a second foreign key value held in the second foreign key of said each first parent table record; and in response to determining that no record in said second parent table holds a second primary key value that equals a second foreign key value held in the second foreign key of said each first parent table record, setting a second integrant field in said each first parent table record to indicate that said second foreign key value does not equal any second primary key value in said second primary key of said second parent table; and querying said first parent table, wherein querying said first parent table includes filtering out any first parent table record from said first parent table having a second integrant field that indicates said second foreign key value does not equal any second primary key value in said second primary key.

8. One or more non-transitory storage media storing one or more sequences of instructions, which when executed by one or more computing devices, cause:

inserting records of a first parent table and a child table of said first parent table into a database, wherein said child table includes a first foreign key that includes a plurality of first foreign key values, wherein said first parent table includes a first primary key that includes a plurality of first primary key values;

for each child table record of a set of child table records of said child table:

determining that no record in said first parent table holds a first primary key value that equals a first foreign key value held in the first foreign key of said each child table record; and in response to determining that no record in said first parent table holds a first primary key value that equals the first foreign key value held in the first foreign key of said each child table record, setting an integrant field in said each child table record to indicate that said first foreign key value does not equal any first primary key value in said first primary key of said first parent table, said integrant field being indexed on an index;

repeatedly index scanning, by a database process, on said index to continuously check for child table records that have the integrant field set to indicate said first foreign key value does not equal any first primary key value in said first primary key;

for each child table record identified by said repeated index scanning:

determining whether a record in said first parent table includes a first primary key value that equals the first foreign key value in said each child table record, where said first parent table is a child of a second parent table;

in response to determining that said record in said first parent table includes the first primary key value, determining whether said record in said first parent table is integrant with the second parent table; and in response to determining that said record in said first parent table is integrant, updating the integrant field of said each child table record to indicate that said first foreign key value equals a first primary key value in said first primary key; and querying said child table, wherein querying said child table includes filtering out any child table record from said child table having an integrant field that indicates said first foreign key value does not equal any first primary key value in said first primary key.

9. The one or more non-transitory storage media of claim 8, wherein said querying includes querying a view that filters records based on each said integrant field.

10. The one or more non-transitory storage media of claim 9, wherein the view filters records based on said integrant field.

11. The one or more non-transitory storage media of claim 8, wherein the instructions, when executed by the one or more computing devices, further cause said querying to be performed in response to receiving a database statement from a client of a database management system that manages said database, said database statement specifying to filter based on said integrant field.

12. The one or more non-transitory storage media of claim 8, wherein each child table record includes a time stamp field that indicates a time when an initial determination was made of a first primary key value not equaling a first foreign key value, wherein the instructions, when executed by the one or more computing devices, further cause, for each child table record that has an integrant field set to indicate that said first foreign key value does not equal any first primary key value in said first primary key of said first parent table:

comparing an initial determination time period from the time when the initial determination was made to a threshold time period; and stopping the repeated index scanning based on the initial determination time period exceeding the threshold time period.

13. The one or more non-transitory storage media of claim 12, wherein the instructions, when executed by the one or more computing devices, further cause issuing an integrity check failure alert based on the initial determination time period exceeding the threshold time period.

14. The one or more non-transitory storage media of claim 8, wherein the first parent table comprises a second foreign key that includes a plurality of second foreign key values;

wherein the second parent table includes a second primary key that includes a plurality of second primary key values;

wherein the instructions, when executed by the one or more computing devices, further cause:

for each first parent table record of a set of first parent table records of said second parent table:

determining that no record in said second parent table holds a second primary key value that equals a second foreign key value held in the second foreign key of said each first parent table record; and in response to determining that no record in said second parent table holds a second primary key value that equals a second foreign key value held in the second foreign key of said each first parent table record, setting a second integrant field in said each first parent table record to indicate that said second foreign key value does not equal any second primary key value in said second primary key of said second parent table; and querying said first parent table, wherein querying said first parent table includes filtering out any first parent table record from said first parent table having a second integrant field that indicates said second foreign key value does not equal any second primary key value in said second primary key.

* * * * *